US012671182B2

(12) United States Patent
Svendsen et al.

(10) Patent No.: US 12,671,182 B2
(45) Date of Patent: Jun. 30, 2026

(54) BEAM ALIGNMENT IN AN APPARATUS

(71) Applicant: NOKIA TECHNOLOGIES OY, Espoo (FI)

(72) Inventors: Simon Svendsen, Aalborg (DK); Samantha Caporal Del Barrio, Aalborg (DK); Johannes Harrebek, Aalborg (DK); Christian Rom, Aalborg (DK); Benny Vejlgaard, Gistrup (DK); Oana-Elena Barbu, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 686 days.

(21) Appl. No.: 18/042,799

(22) PCT Filed: Aug. 20, 2021

(86) PCT No.: PCT/FI2021/050565
§ 371 (c)(1),
(2) Date: Feb. 24, 2023

(87) PCT Pub. No.: WO2022/043607
PCT Pub. Date: Mar. 3, 2022

(65) Prior Publication Data
US 2023/0352838 A1    Nov. 2, 2023

(30) Foreign Application Priority Data
Aug. 24, 2020    (FI) ..................................... 20205821

(51) Int. Cl.
*H04B 7/06*    (2006.01)
*H01Q 3/26*    (2006.01)
(Continued)

(52) U.S. Cl.
CPC ........... *H01Q 9/0407* (2013.01); *H01Q 3/267* (2013.01); *H04B 7/0608* (2013.01); *H04B 17/12* (2015.01)

(58) Field of Classification Search
CPC .... H04B 7/0608; H04B 17/12; H01Q 9/0407; H01Q 3/267
See application file for complete search history.

(56) References Cited

U.S. PATENT DOCUMENTS 6,122,260 A * 9/2000 Liu ...................... H04B 7/0632
                                                              370/280
6,348,891 B1 * 2/2002 Uemura ................... H01Q 3/34
                                                              342/410
(Continued)

FOREIGN PATENT DOCUMENTS

WO    WO 2019/052655 A1    3/2019
WO    WO 2019/060287 A1    3/2019
(Continued)

OTHER PUBLICATIONS

"3rd Generation Partnership Project; Technical Specification Group Radio Access Network; NR; Physical layer procedures for data (Release 16)", 3GPP TS 38.214 v16.6.0, (Jun. 2021), 172 pages.
(Continued)

*Primary Examiner* — Dominic E Rego
(74) *Attorney, Agent, or Firm* — ALSTON & BIRD LLP

(57) ABSTRACT
An apparatus, which comprises at least one antenna array comprising a plurality of array elements having cross-polarized coupled branches, is configured to adjust at least its uplink beam steering direction by measuring (301), while transmitting a combined uplink signal via the plurality of the array elements as individual signals forming the combined uplink signal, per an array element, first signal on an unused branch of the array element, and using the first signal and
(Continued)

measure per reception path first signal while transmitting combined signal    ~ 301 use for other than reference first signal results relative or both relative and normalized results    ~ 302 determine delta values based on measurement results of first signals and corresponding refence values    ~ 303 cause adjusting array elements according to corresponding delta values    ~ 304 reference information in the memory to adjust if needed, at least one beam steering setting.

20 Claims, 4 Drawing Sheets

(51) Int. Cl.
    *H01Q 9/04*        (2006.01)
    *H04B 17/12*       (2015.01)

(56)               References Cited

U.S. PATENT DOCUMENTS

| | | | | |
|---|---|---|---|---|
| 6,496,140 | B1 * | 12/2002 | Alastalo | H01Q 3/267 |
| | | | | 342/174 |
| 6,615,024 | B1 * | 9/2003 | Boros | H04B 7/0615 |
| | | | | 455/67.14 |
| 6,980,527 | B1 * | 12/2005 | Liu | H04B 7/0408 |
| | | | | 370/280 |
| 7,460,835 | B1 * | 12/2008 | Petrus | H04B 17/391 |
| | | | | 455/67.11 |
| 8,891,598 | B1 | 11/2014 | Wang et al. | |
| 9,124,333 | B1 * | 9/2015 | Mansour | H04W 72/046 |
| 2005/0140546 | A1 * | 6/2005 | Park | G01S 7/4008 |
| | | | | 342/368 |
| 2010/0016005 | A1 * | 1/2010 | Sugawara | H04L 12/40013 |
| | | | | 455/509 |
| 2013/0057447 | A1 * | 3/2013 | Pivit | H01Q 3/267 |
| | | | | 343/853 |
| 2014/0269554 | A1 | 9/2014 | Shapira et al. | |
| 2014/0293954 | A1 * | 10/2014 | Horvat | H04W 48/16 |
| | | | | 370/330 |
| 2016/0066340 | A1 * | 3/2016 | Zhang | H04W 24/08 |
| | | | | 370/252 |
| 2016/0242147 | A1 * | 8/2016 | Tarlazzi | H04W 88/085 |
| 2017/0115384 | A1 * | 4/2017 | Loesch | G01S 13/42 |
| 2017/0310403 | A1 | 10/2017 | Nardozza | |
| 2017/0331577 | A1 | 11/2017 | Parkvall et al. | |
| 2019/0173500 | A1 | 6/2019 | Artemenko et al. | |
| 2020/0083967 | A1 | 3/2020 | Garcia et al. | |
| 2020/0119772 | A1 * | 4/2020 | Interdonato | H04B 7/0452 |

FOREIGN PATENT DOCUMENTS

| | | | |
|---|---|---|---|
| WO | WO 2020/043310 | A1 | 3/2020 |
| WO | WO 2020/064128 | A1 | 4/2020 |

OTHER PUBLICATIONS

"3rd Generation Partnership Project; Technical Specification Group Radio Access Network; Study on New Radio Access Technology Physical Layer Aspects (Release 14)", 3GPP TR 38.802 V14.2.0, (Sep. 2017), 145 pages.

International Search Report and Written Opinion for Patent Cooperation Treaty Application No. PCT/FI2021/050565 dated Nov. 25, 2021, 16 pages.

Office Action for Finland Appliction No. 20205821 dated Mar. 9, 2021, 9 pages.

Sakaguchi et al., "Comprehensive Calibration for MIMO System", The 5th International Symposium on Wireless Personal Multimedia Communications, (Dec. 16, 2002), 4 pages.

Shipley et al., "Mutual Coupling-Based Calibration of Phased Antenna Arrays", Proceedings of the 2000 IEEE International Conference on Phased Array Systems and Technology, (Aug. 6, 2002), 4 pages.

* cited by examiner

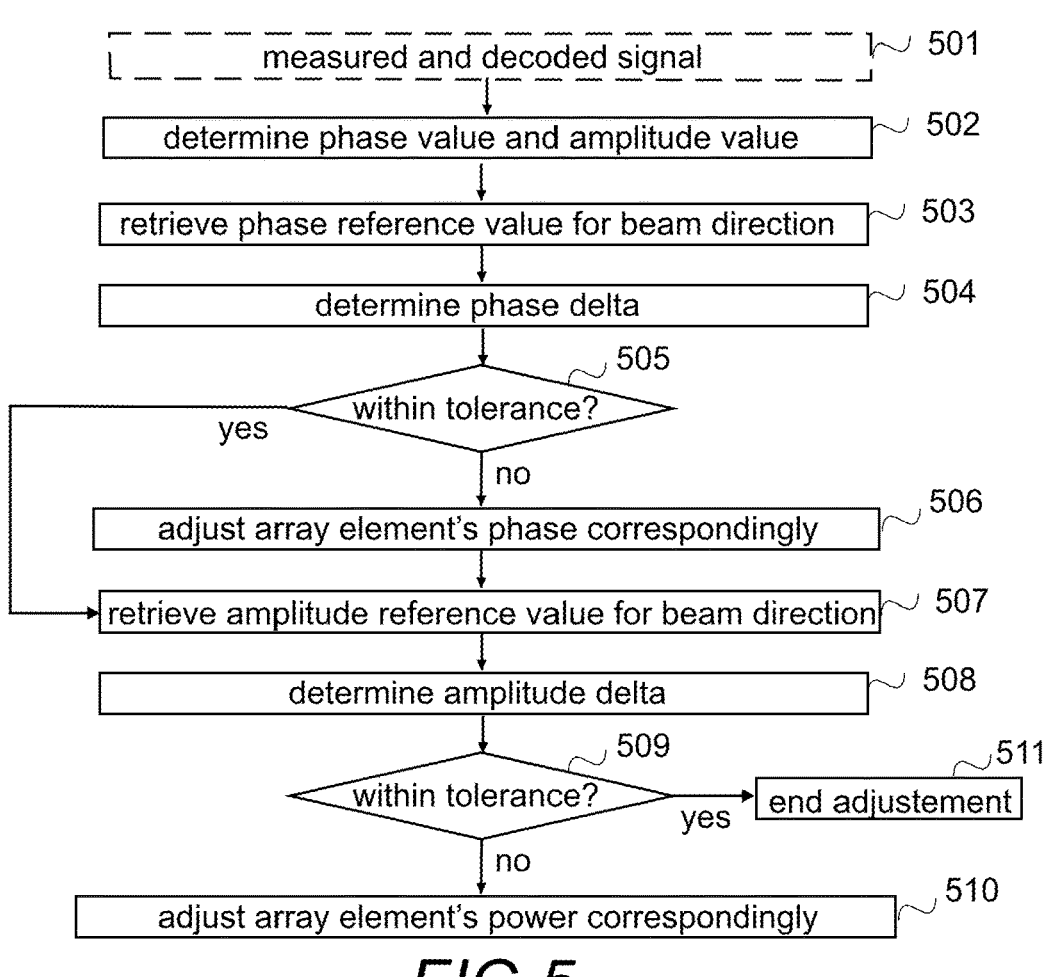

measured and decoded signal ~ 501 determine phase value and amplitude value ~ 502 retrieve phase reference value for beam direction ~ 503 determine phase delta ~ 504 within tolerance? ~ 505 yes no adjust array element's phase correspondingly ~ 506 retrieve amplitude reference value for beam direction ~ 507 determine amplitude delta ~ 508 within tolerance? ~ 509          end adjustement ~ 511 yes no adjust array element's power correspondingly ~ 510

*FIG.5*

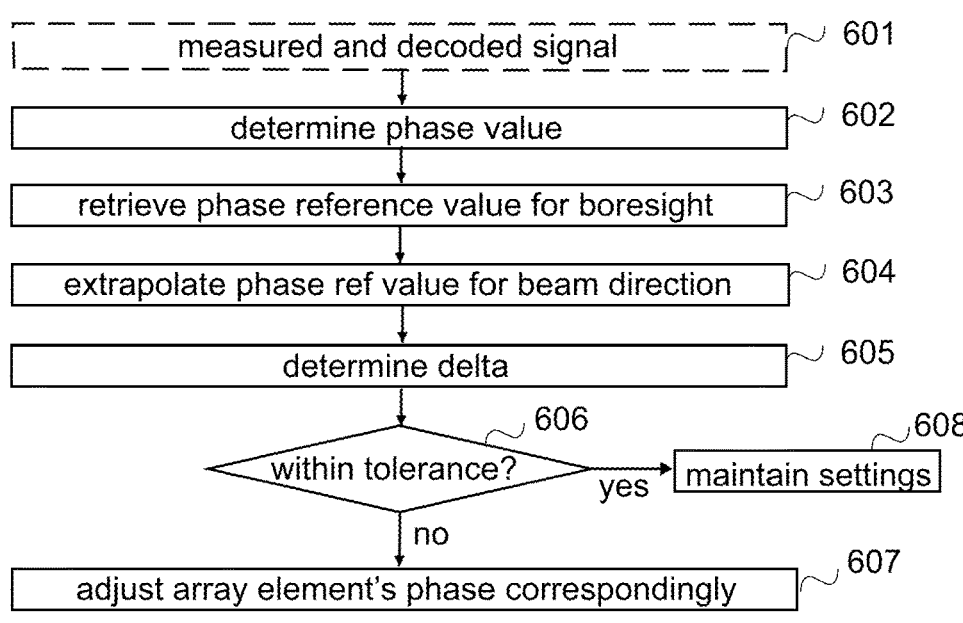

measured and decoded signal ~ 601 determine phase value ~ 602 retrieve phase reference value for boresight ~ 603 extrapolate phase ref value for beam direction ~ 604 determine delta ~ 605 within tolerance? ~ 606          maintain settings ~ 608 yes no adjust array element's phase correspondingly ~ 607

*FIG.6*

BEAM ALIGNMENT IN AN APPARATUS

CROSS-REFERENCE TO RELATED APPLICATIONS

This application is a national phase entry of International No. PCT/FI2021/050565, filed Aug. 20, 2021, which claims priority to Finnish Application No. 20205821, filed Aug. 24, 2020, the contents of which are hereby incorporated by reference in their entirety.

TECHNICAL FIELD

Various example embodiments relate to wireless communications and, particularly, to beam alignment in an apparatus.

BACKGROUND

Wireless communication systems are under constant development. For example, beamforming may be used to compensate for high path loss rates. Beam-forming is a communication technique in which a transmitter transmits a directional transmission beam towards a receiver. Beams in the transmitter and the receiver should be aligned to maximize a directional gain. Beam alignment between an access node providing a wireless cell and an apparatus in the cell is based on downlink measurements, resulting to alignment between a transmission beam of the access node and a reception beam of the apparatus. The same beam direction is used also for uplink, based on assumption on a spatial reciprocity.

BRIEF DESCRIPTION

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

An aspect provides an apparatus comprising at least one antenna array comprising a plurality of array elements having cross-polarized coupled branches, at least one processor, and at least one memory including computer program code and reference information, the at least one memory and computer program code configured to, with the at least one processor, cause the apparatus at least to perform: measuring, while transmitting a combined uplink signal via the plurality of the array elements as individual signals forming the combined uplink signal, per an array element, a first signal on an unused branch of the array element, the first signal being a coupled individual signal of the transmitted combined uplink signal; performing, per an array element, at least following: determining a delta value based on a phase value of the first signal and the reference information; and adjusting, in response to the delta value not being within a tolerance, phase at least in the branch used for transmitting correspondingly.

In an embodiment, wherein the memory further comprises a factor value for relative phase difference between adjacent antenna elements, the reference information comprises boresight cross-polarized coupled values, the at least one memory and computer program are code configured to, with the at least one processor, cause the apparatus further to perform the determining of the delta value by performing: retrieving from the reference information a reference value for the antenna element based on the order of the antenna element in the antenna array; extrapolating the reference value using the factor value to an estimated reference value for a beam steering direction in use; and using the estimated reference value to determine the delta value.

In an embodiment, wherein the reference information comprises reference values for different beam steering directions, the at least one memory and computer program code are configured to, with the at least one processor, cause the apparatus further to perform the determining of the delta value by performing: retrieving from the reference information a reference value for the antenna element based on the order of the antenna element in the antenna array and a beam steering direction in use; and using the reference value to determine the delta value.

In an embodiment, the at least one memory and computer program code are configured to, with the at least one processor, cause the apparatus further to perform, per an array element: retrieving from the reference information a further reference value for the antenna element based on the order of the antenna element in the antenna array and the beam steering direction in use; determining a further delta value between an amplitude value of the first signal and the further reference value; and adjusting, in response to the further delta not being within a further tolerance, power at least in the branch used for transmitting correspondingly.

In an embodiment, wherein one of the antenna elements is a reference antenna element, the at least one memory and computer program code are further configured to, with the at least one processor, cause the apparatus to use with the reference antenna element absolute values of the first signal of the reference antenna element and with the other antenna elements first signals that are relative to the first signal of the reference antenna element.

In an embodiment, wherein one of the antenna elements is a reference antenna element, the at least one memory and computer program code are further configured to, with the at least one processor, cause the apparatus to use with the reference antenna element absolute values of the first signal of the reference antenna element and with the other antenna elements first signals that are relative and normalized to the first signal of the reference antenna element.

In an embodiment, the at least one memory and computer program code are configured to, with the at least one processor, cause the apparatus further to perform the measuring first signals in response to the apparatus sending as the combined uplink signal an uplink signal comprising user data.

In an embodiment, the at least one memory and computer program code are configured to, with the at least one processor, cause the apparatus further to perform the measuring first signals in response to the apparatus sending as the combined uplink signal an uplink signal comprising control data.

In an embodiment, the reference information comprises values obtained during over the air calibration of another apparatus.

In an embodiment, the apparatus comprises at least per a reception branch a coupler coupled to the antenna element.

In an embodiment, the apparatus comprises at least per a reception branch an adjustable attenuator coupled to the antenna element.

An aspect provides a method comprising: measuring, by an apparatus, while transmitting a combined uplink signal via a plurality of array elements having cross-polarized coupled branches as individual signals forming the combined uplink signal, per an array element, a first signal on an unused branch of the array element, the first signal being a coupled individual signal of the transmitted combined uplink signal; determining, by the apparatus, per an array element, a delta value based on a phase value of the first signal and the reference information; and adjusting, by the apparatus, in response to the delta value not being within a tolerance, phase at least in the branch of the array element used for transmitting correspondingly.

In an embodiment, wherein the reference information comprises reference values for different beam steering directions, the method further comprises: retrieving from reference information, which comprises reference values for different beam steering directions, reference values for phase and for amplitude for the antenna element based on the order of the antenna element in the antenna array and a beam steering direction in use; using the reference value for phase to determine the delta value; determining a further delta value between an amplitude value of the first signal and the reference value for amplitude; and adjusting, in response to the further delta not being within a further tolerance, power at least in the branch used for transmitting correspondingly.

An aspect provides a computer program comprising instructions for causing an apparatus to perform at least the following: measuring, while transmitting a combined uplink signal via a plurality of array elements having cross-polarized coupled branches as individual signals forming the combined uplink signal, per an array element, a first signal on an unused branch of the array element, the first signal being a coupled individual signal of the transmitted combined uplink signal; determining, per an array element, a delta value based on a phase value of the first signal and the reference information; and adjusting, in response to the delta value not being within a tolerance, phase at least in the branch of the array element used for transmitting correspondingly.

An aspect provides a computer readable medium comprising program instructions for causing an apparatus to perform at least the following: measuring, while transmitting a combined uplink signal via a plurality of array elements having cross-polarized coupled branches as individual signals forming the combined uplink signal, per an array element, a first signal on an unused branch of the array element, the first signal being a coupled individual signal of the transmitted combined uplink signal; determining, per an array element, a delta value based on a phase value of the first signal and the reference information; and adjusting, in response to the delta value not being within a tolerance, phase at least in the branch of the array element used for transmitting correspondingly.

BRIEF DESCRIPTION OF DRAWINGS

Embodiments are described below, by way of example only, with reference to the accompanying drawings, in which

FIGS. 3 to 6 illustrate example functionalities; and

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first element could be termed a second element, and similarly, a second element could be also termed a first element without departing from the scope of the present disclosure.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultrawideband (UWB) technology, sensor networks, mobile ad-hoc networks (MANETs) and Internet Protocol multimedia subsystems (IMS) or any combination thereof.

Figure 1:
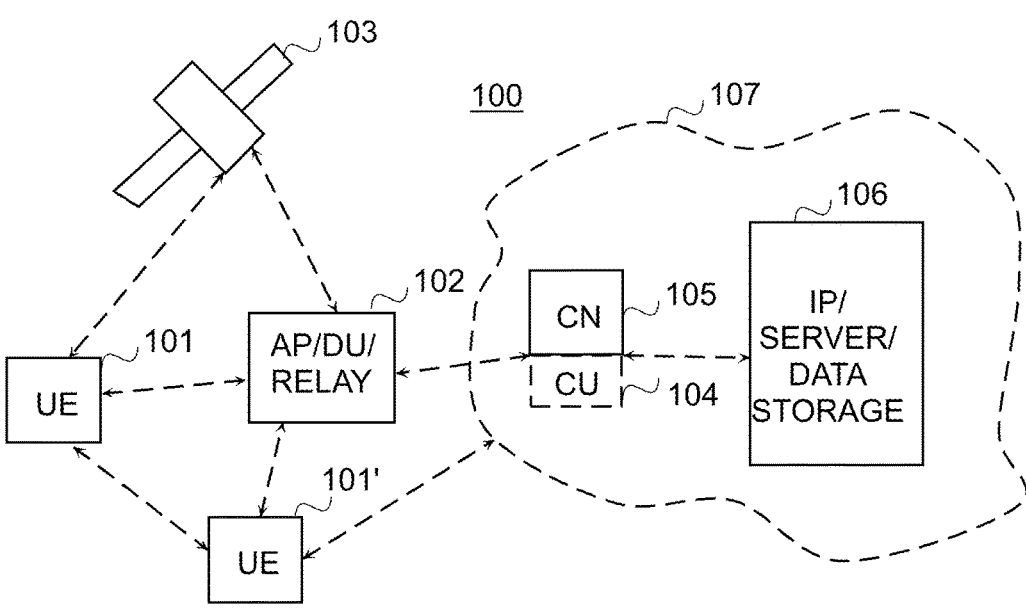
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a relay node, such as a mobile termination (MT) part of the integrated access and backhaul (IAB) Node), is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyberphysical system (CPS) (a system of collaborating computational elements controlling physical entities). CPS may enable the implementation and exploitation of massive amounts of interconnected ICT devices (sensors, actuators, processors micro-controllers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF)

and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to sup-port multiple hierar-chies, where MEC servers can be placed between the core and the base station or nodeB (gNB). It should be appreci-ated that MEC can be applied in 4G networks as well.

5G may also utilize satellite communication to enhance or complement the coverage of 5G service, for example by providing backhauling. Possible use cases are providing service continuity for machine-to-machine (M2M) or Inter-net of Things (IoT) devices or for passengers on board of vehicles, or ensuring service availability for critical com-munications, and future railway/maritime/aeronautical com-munications. Satellite communication may utilise geosta-tionary earth orbit (GEO) satellite systems, but also low earth orbit (LEO) satellite systems, in particular mega-constellations (systems in which hundreds of (nano)satel-lites are deployed). Each satellite 103 in the mega-constel-lation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distrib-uted unit (DU) parts of one or more IAB nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be imple-mented as a multilayer network including several kinds of cells. Typically, in multilayer networks, one access node provides one kind of a cell or cells, and thus a plurality of (e/g)NodeBs are required to provide such a network struc-ture.

For fulfilling the need for improving the deployment and performance of communication systems, the concept of "plug-and-play" (e/g)NodeBs has been introduced. Typi-cally, a network which is able to use "plug-and-play" (e/g)Node Bs, includes, in addition to Home (e/g)NodeBs (H (e/g)nodeBs), a home node B gateway, or HNB-GW (not shown in FIG. 1). A HNB Gateway (HNB-GW), which is typically installed within an operator's network may aggre-gate traffic from a large number of HNBs back to a core network.

Figure 2:
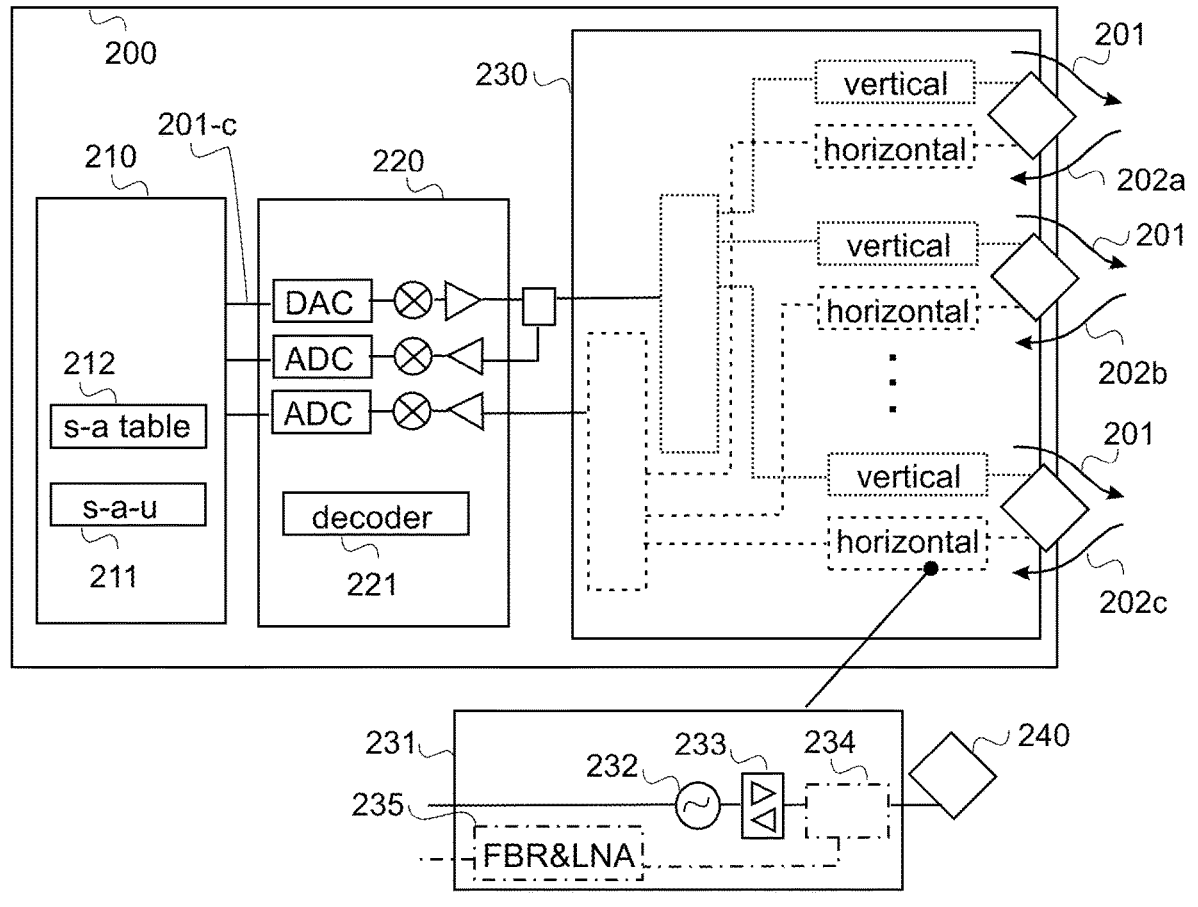
FIG. 2 is a schematic block diagram.

FIG. 2 is a schematic block diagram showing some elements and modules in a user device 200, used as a non-limiting example of an apparatus, to depict basic struc-ture and concept on a generalized level, only for illustrative purposes. It should be appreciated that an apparatus, such as the user device 200, may comprise also other elements, such as elements for controlling operations. Further, optional elements illustrated by dot-and-dash line may be left out.

Referring to FIG. 2, the user device 200 comprises a baseband module 210, a transceiver module 220 and an RF module 230.

The RF module 230 provides downlink MIMO and com-prises an antenna array with n array elements 240 (array patches). An array element (array patch) comprises two cross-polarized coupled branches, a horizontal branch and a vertical branch, one of the branches being used for trans-mitting an individual signal 201 and the unused branch for uplink transmission for receiving a cross-polarized coupled signal 202$a$, 202$b$, 202$c$ (cross-polarization coupling mea-surements). Assuming that both branches can be used for transmitting and receiving, the hardware details of a branch are the same. In a first embodiment, a branch 231 comprises a phase shifter 232 coupled to a circuitry 233 comprising a power amplifier (PA) for transmitting and a low noise amplifier (LNA) for receiving, the circuitry 233 being con-nected to the antenna element 240 via a coupler 234, the coupler 234 being connected also to a circuitry 235 com-prising a feedback receiver (FBR) switch and a low noise amplifier (LNA). In the first embodiment, the circuitry 235 is connected to a decoder 221 in the transceiver module. In a second embodiment, the branch 231 comprises instead of the coupler 234 an attenuator, and there is not circuitry 235. The attenuator may be an adjustable or tunable or switchable attenuator. In a third embodiment, the circuitry 233 is directly coupled to the antenna element 240, i.e. there is no elements 234 and 235. Regardless of the embodiment, if the branch is a branch only for reception, the circuitry 233 comprises only the low noise amplifier, and correspond-ingly, if a branch is only for transmitting, the circuitry 233 comprises only the power amplifier.

In the illustrated example, the transceiver module 220 comprises one digital to analog converter (DAC), two ana-log to digital convertes (ADC), one modulator, two demodu-lators, one power amplifier and two low noise amplifiers. As a new element, the transceiver module 220 comprises the decoder 221 as a feedback receiver for decoding of the received cross-polarized coupled signals, forwarded to the baseband module 210.

The baseband module 210 comprises as new elements a self-adjusting unit (s-a-u) 211 and a self-adjusting table (s-a table) 212. The functionality of the self-adjusting unit will be described in detail with FIGS. 3 to 6. It should be appreciated that part of the functionalities described may be performed by the decoder 221.

The self-adjusting table comprises reference information for antenna elements (patches). In a first implementation of the reference information, the reference information com-prises cross-polarized coupled (CPC) reference values for each antenna element for amplitude and for phase in pre-determined transmission beam steering directions (beam directions). All values in the reference information may be absolute values. Alternatively, one of the antenna elements, a reference antenna element, may have absolute values and the values for other antenna elements are relative and might be normalized to the absolute values of the reference antenna element in the reference information. An example illustrating the reference information, when relative and normalized values are used and antenna element (patch) 1 is used as the reference antenna element (reference patch), is given below in two-part table for an antenna array having size of 1×8, P denoting an antenna patch (element), and for four beam steering directions. Naturally, a self-adjusting table can comprise any number of beam steering directions for an antenna array of any size.

TABLE 1

| Reference information in the first implementation | | | | | | | | |
|---|---|---|---|---|---|---|---|---|
| Beam direction | P1 | P2 | P3 | P4 | P5 | P6 | P7 | P8 |
| | Amplitude in dBm (in P2 to P8 relative values to P1) | | | | | | | |
| 0° | −3.1 | −0.7 | 0 | 0.3 | −1.3 | 0.1 | −0.3 | −1.7 |
| 15° | −1.5 | −1.0 | −0.9 | −1.1 | 0.8 | −2.4 | 1.3 | −2.3 |
| 30° | −1.2 | −0.3 | −0.9 | −0.5 | −3.1 | −0.8 | 1.4 | −5.9 |
| 45° | 0.6 | −0.2 | −0.8 | −0.4 | 1.3 | 2.3 | 1.3 | −3.8 |
| | Phase in ° (in P2 to P8 relative and normalized values to P1) | | | | | | | |
| 0° | 0 | −4 | −4 | −1 | −14 | 7 | −23 | 32 |
| 15° | 0 | 45 | 84 | 128 | 179 | 225 | 257 | 338 |
| 30° | 0 | 96 | 183 | 278 | 7 | 78 | 190 | 298 |
| 45° | 0 | 142 | 276 | 46 | 181 | 328 | 119 | 251 |

In a second implementation of the reference information, the reference information comprises cross-polarized coupled (CPC) reference values for each antenna element for phase in predetermined transmission beam steering directions (beam directions). An example illustrating the reference information, when relative and normalized values are used and the antenna element (patch) 1 is used as the reference antenna element (reference patch), is given below for an antenna array having size of 1×8, P denoting an antenna patch (element), and for four beam steering directions. As can be seen, the table 2 corresponds to the phase part of the table 1. Naturally, a self-adjusting table can comprise any number of beam steering directions for an antenna array of any size. Further, the reference values in table 2 have been normalized to P1 for easier comparison of the different transmission beam steering directions.

TABLE 2

| Reference information in the second implementation | | | | | | | | |
|---|---|---|---|---|---|---|---|---|
| Beam direction | Phase in ° (in P2 to P8 relative and normalized values to P1) | | | | | | | |
| | P1 | P2 | P3 | P4 | P5 | P6 | P7 | P8 |
| 0° | 0 | −4 | −4 | −1 | −14 | 7 | −23 | 32 |
| 15° | 0 | 45 | 84 | 128 | 179 | 225 | 257 | 338 |
| 30° | 0 | 96 | 183 | 278 | 7 | 78 | 190 | 298 |
| 45° | 0 | 142 | 276 | 46 | 181 | 328 | 119 | 251 |

In a third implementation of the reference information, the reference information comprises cross-polarized coupled (CPC) reference values for each antenna element for phase in boresight. An example illustrating the reference information, when relative and normalized values are used and antenna element (patch) 1 is used as the reference antenna element (reference patch), is given below for an antenna array having size of 1×8, P denoting an antenna patch (element). As can be seen, the table 3 corresponds to the first line of the phase part of the table 1. As in the other implementations, the third implementation of the reference information may be applied to an antenna array of any size.

TABLE 3

| Reference information in the third implementation | | | | | | | | |
|---|---|---|---|---|---|---|---|---|
| Beam direction | Phase in ° (in P2 to P8 relative and normalized values to P1) | | | | | | | |
| | P1 | P2 | P3 | P4 | P5 | P6 | P7 | P8 |
| 0° | 0 | −4 | −4 | −1 | −14 | 7 | −23 | 32 |

In the third implementation, reference values for different beam steering direction may be estimated by correlating a beam steering direction in degrees to a known and fixed relative phase difference factor between adjacent array elements. In the third implementation, the possible beam steering directions are limited only by the granularity of the used phase shifters, whereas in the first and second implementations also the granularity of the reference information limits the possible beam steering directions. The difference factor used in the third implementation depends on an antenna element spacing of the antenna array. For example, using a factor of 3, 15° beam steering angle corresponds to approximately 45° phase shift between adjacent antenna elements in the array. An example illustrating estimated reference information for three beam steering directions, based on the boresight reference values, is given below for the antenna array comprising 8 antenna patches (P). As can be seen, the estimated reference values in table 4 are similar to the reference values in table 2.

TABLE 4

| Estimated values (in italic) based on boresight reference information | | | | | | | | |
|---|---|---|---|---|---|---|---|---|
| Beam direction | Phase in ° | | | | | | | |
| | P1 | P2 | P3 | P4 | P5 | P6 | P7 | P8 |
| 0° | 0 | −4 | −4 | −1 | −14 | 7 | −23 | 32 |
| 15° | *0* | *42* | *86* | *134* | *165* | *232* | *247* | *347* |
| 30° | *0* | *87* | *176* | *269* | *345* | *97* | *157* | *302* |
| 45° | *0* | *132* | *266* | *44* | *165* | *322* | *67* | *257* |

The reference information in the user device 200, i.e. the CPC values (CPC reference values) in table 1, table 2 or table 3 may be obtained by performing over the air (OTA) calibration for the user device 200 while it is manufactured. However, thanks to the self-adjusting, which will be described in more detail below, it is also possible to perform over the air calibration for one reference apparatus (reference user device), called a golden apparatus (a golden device), and then store the thus obtained reference information to other apparatuses (user devices) having the same mechanical stack-up and antenna array, thereby avoiding individual over the air calibration of the apparatuses (user devices). This approach saves quite a lot of time in the manufacturing, thereby increasing productivity of the manufacturing process. (The mechanical stack-up may comprise, for example, a front glass, a substrate between the front glass and a metal chassis, the metal chassis covering circuitries of the user device, a plastic frame around the metal chassis between the front glass and a rear class.)

When there is data to be transmitted from the user device 200, a signal 201-*c* carrying the data is generated. The signal is called herein a combined uplink signal 201-*c* (a combined transmission signal) and in 5G the signal 201-*c* generated by the baseband module is a quadrature (IQ) signal. The IQ signal is used as an example herein. However, any other signal type can be used as well. The combined signal passes through the digital to analog converter (DAC), the modulator, the power amplifier and is then transmitted in a plurality of individual signals 201 via a plurality of cross-polarized coupled antenna elements, an antenna element 240 transmitting an individual signal 201, the individual signals 201 forming the combined uplink signal 201-*c*. The cross-polarized coupling in the antenna element causes that a portion of an individual signal 201 transmitted over one branch is coupled to the other, unused branch. In the illustrated example the vertical branch is used for transmission, and the unused branch is the horizontal branch. The transmission of the individual signals 201 causes that corresponding coupled individual signals 202*a*, 202*b*, 202*c*, called herein first signals, are received in the antenna elements on the unused branches, which in the illustrated example are the horizontal branches.

In the first embodiment, the first signal 202*a*, 202*b*, 202*c* passes via the coupler 234, whose output is switched to go to the circuitry 235 comprising the feedback receiver switch and the low noise amplifier. By this protective mode (bypass mode) the first signal does not pass through the low noise amplifier 233 (which is switched off or in a protective mode) coupled to the phase shifter 232 to protect the low noise amplifier from saturation, or in worst case from damaging it, if the transmission power of individual signals 201 is high. The first signal is then forwarded from the circuitry 235 to the decoder 221 which decodes the first signal to a quadrature (IQ) signal or corresponding I&Q values, forwarded to the self-adjusting unit 211 in the baseband module 210.

In the second embodiment, the first signal 202*a*, 202*b*, 202*c* passes via the adjustable (tunable/switchable) attenuator 234, adjusted to attenuate the first signal before it passes to the low noise amplifier 233 coupled to the phase shifter 232 to protect the low noise amplifier from saturation, or in worst case from damaging it, if the transmission power of individual signals 201 is high. The first signal is then forwarded via the normal reception path to the decoder 221 which decodes the first signal to a quadrature (IQ) signal or corresponding I&Q values, forwarded to the self-adjusting unit 211 in the baseband module 210.

In the third embodiment, it is assumed that the low noise amplifier will not saturate even if the transmission power is high, and hence the first signal passes directly from the antenna element 140 to the low noise amplifier 233 coupled to the phase shifter 232. The first signal is then forwarded via the normal reception path to the decoder 221 which decodes the first signal to a quadrature (IQ) signal or corresponding I&Q values, forwarded to the self-adjusting unit 211 in the baseband module 210.

Figure 3:
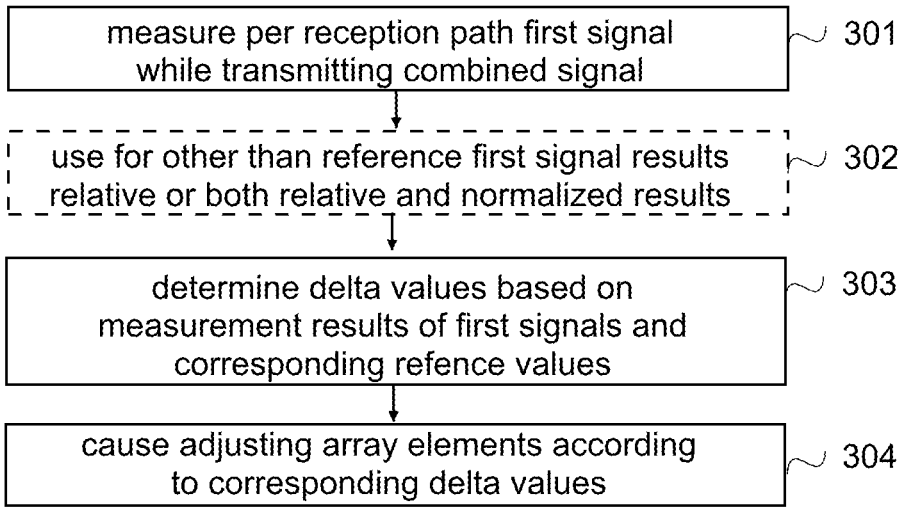

FIG. 3 illustrates an example functionality how the apparatus, regardless of the hardware used in the reception branch, i.e. regardless of a reception path, may align its transmission beam with a reception beam of the access node, such as gNB. In other words, for a user device, an example how to perform uplink beam alignment is discussed.

Referring to FIG. 3, while a combined signal is transmitted via a plurality of array elements having cross-polarization coupled branches, it is measured in block 301 per an unused branch a first signal, which is a coupled transmission signal. In other words, an actual transmission signal, used for user data or control data, is used as a reference signal and measured on the corresponding unused cross-polarized coupled branches. Hence, phase and also amplitude changes introduced by the different components, like power amplifiers, phase shifters, etc., environmental changes, like temperature, humidity, etc. will be taken into account. In other words, actual coupling conditions on the antenna array will be reflected. (Applying a low power reference signal on one or more array elements, will not mimic the actual coupling at the antenna array.) Furthermore, by using the actual transmission signal also as a reference signal enables uplink beam alignment without any additional scheduled resources for transmitting one or more reference signals.

In one embodiment, for one patch absolute values of its first signal (reference first signal) is used (block 302) and for the other patches (antenna elements), instead of the absolute values, values (measurement results) that are relative and might also be normalized to the first reference signal are used (block 302). For example, the reference first signal of the reference cross-polarized coupled branch is measured and decoded to IQ format first, so that the measurements of other first signals on other branches can be relative to the measured reference first signal and might also be normalized to the measured reference first signal. Naturally, if only absolute values are used, block 302 is skipped over.

Then, per an array element, one or more delta values are determined in block 303 based on the measured first signal (measurement results of the first signal) and corresponding one or more reference values. As a last measure, adjusting the plurality of the array elements is caused in block 304, according to corresponding delta values. In other words, the actual coupling on the array are reflected and the apparatus is able to automatically perform correct actions to re-align and/or adjust its transmission beam in case re-alignment and/or adjustment is needed. The adjustment may be performed to both branches or to the branch used in block 301 for the transmission.

Figure 4:
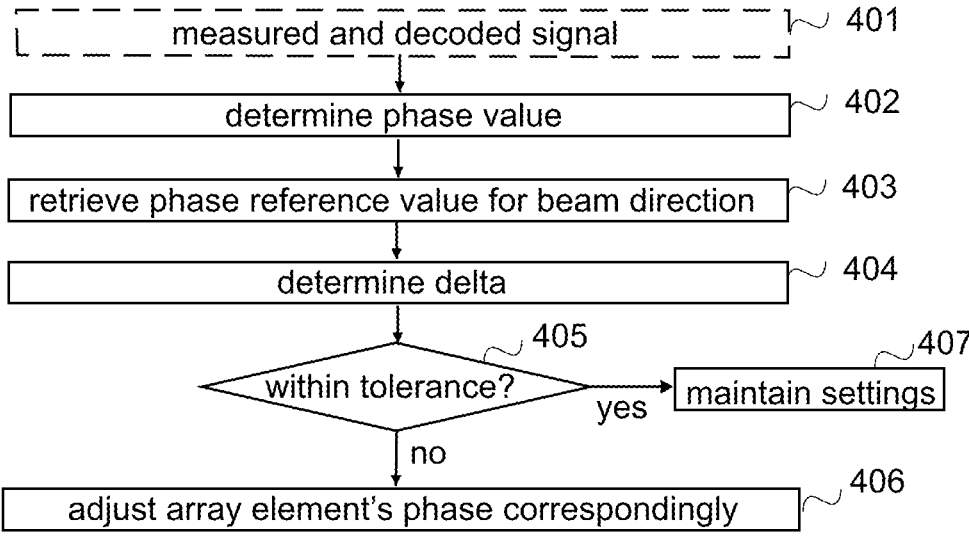

FIGS. 4 to 6 illustrate different examples how the apparatus, or more precisely the self-adjusting unit performs the re-alignment and or adjustment of an array element using the reference information. The functionality described is performed for all array elements, i.e. for all antenna patches. In the example of FIG. 4, the reference information comprises reference values for each antenna element for phase in predetermined transmission beam steering directions , in the example of FIG. 5 the reference information comprises reference values for each antenna element for amplitude and for phase in predetermined transmission beam steering directions, and in the example of FIG. 6 the reference information comprises reference values for each antenna element for phase in boresight.

Referring to FIG. 4, when a measured first signal has been decoded to IQ format (block 401), be that an absolute measurement result or relative and possibly also normalized measurement result, a phase value (result value) is determined in block 402. A reference value for the phase (phase reference value) is retrieved (obtained, inquired) in block 403 from the reference information for the patch in question, based on the current angular beam steering direction of the combined signal. For example, using the table 2 with relative values for patches two to eight, if the beam steering direction is 45° and the patch is the patch number four, a value of 46° is retrieved in block 403. Then a delta between the result value and the retrieved value is determined in block 404. If the delta is not within a tolerance (block 405:no), the phase of the phase shifter(s) is adjusted in block 406 in the branch(es) of the antenna element. If the delta is within the tolerance (block 405: yes), settings are maintained in block 407. In other words, no re-alignment/adjustment of the beam is performed. The tolerance may depend on the granularity of the phase shifters in use and/or the granularity of the reference information and/or the frequency used for transmitting the combined signal. For example, for 28 GHz frequency and the granularity of the table 2, tolerance may be from −5° to +5°.

Referring to FIG. 5, when a measured first signal has been decoded to IQ format (block 501), be that an absolute measurement result or relative and possibly also normalized measurement result, a phase value (result phase values) and amplitude value (result amplitude value) are determined in block 502. A reference value for the phase (phase reference value) is retrieved (obtained, inquired) in block 503 from the reference information for the patch in question, based on the current angular beam steering direction of the combined signal. For example, using the table 1 with relative values for patches two to eight, if the beam steering direction is 45° and the patch is the patch number four, a value of 46° is retrieved in block 503. Then a delta (a phase delta) between the result phase value and the retrieved phase value is determined in block 504. If the delta (phase delta) is not within a tolerance (block 505:no), the phase of the phase shifters is adjusted in block 506 in the branches of the antenna element. After that, or if the delta is within the tolerance (block 505: yes), a reference value for the amplitude (amplitude reference value) is retrieved (obtained, inquired) in block 507 from the reference information for the patch in question, based on the current angular beam steering direction of the combined signal. For example, using the table 1 with relative values for patches two to eight, if the beam steering direction is 45° and the patch is the patch number four, a value of −0.4 dB is retrieved in block 507. Then a delta (an amplitude delta) between the result amplitude value and the retrieved amplitude value is determined in block 508. If the delta (amplitude delta) is not within its tolerance (block 509:no), the power of power amplifier(s) is adjusted in block 510 in the branch(es) of the antenna element. If the amplitude delta is within the tolerance (block 509: yes), adjustment round is ended in block 511 without any power adjustment (phase may have been adjusted). The tolerance for the amplitude may depend on the granularity of the power amplifiers in use and/or the granularity of the reference information and/or the frequency used for transmitting the combined signal. For example, for 28 GHz frequency and the granularity of the table 2, tolerance may be from −4 dB to +4 dB.

It should be appreciated that even though in the above the block 503 to 511 were used to describe possibly phase and possible power adjustments as separate blocks, on should appreciate that corresponding blocks, for example blocks 503 and 507, may be combined.

Referring to FIG. 6, when a measured first signal has been decoded to IQ format (block 601), be that an absolute measurement result or relative and possibly also normalized measurement result, a phase value (result value) is determined in block 602. A reference value for the phase (phase reference value) is retrieved (obtained, inquired) in block 603 from the reference information for the patch in question. For example, using the table 3 with relative values for patches two to eight, if the patch is the patch number four, a value of −1° is retrieved in block 603. Then, using the factor, which depends on the element spacing, as described above with the tables 3 and 4, a phase reference value for the beam steering direction is extrapolated in block 604 from the retrieved value. Assuming that the factor is 3 and the beam steering direction is 45°, the resulting phase reference value to the patch number four could be 44°. Then a delta between the result value and the phase reference value (the result value of the extrapolation) is determined in block 605. If the delta is not within a tolerance (block 606:no), the phase of the phase shifter(s) is adjusted in block 607 in the branch(es) of the antenna element. If the delta is within the tolerance (block 606: yes), settings are maintained in block 608. In other words, no re-alignment/adjustment of the beam is performed. As above, the tolerance may depend on the granularity of the phase shifters in use and/or the frequency used for transmitting the combined signal. For example, for 28 GHz frequency, tolerance may be from −5° to +5°.

In another examples, instead of adjusting (block 304, block 408, block 506, block 510, block 607) a network assisted beam correspondence check may be triggered.

Even though not illustrated in Figures, the hardware may comprise circuitries for signal interference cancellation, and feedback signal obtained therefrom may be used to improve the accuracy of the value, or values, determined from the first signal, thereby improving the alignment of the transmission beam (or detection of the transmission beam misalignment).

As is evident from the above examples, several ways to implement a concept that will allow the apparatus to autonomously align and adjust its transmission beam in a closed loop manner is disclosed. Any of the disclosed apparatus autonomous closed loop transmission beam tuning methods (functionalities) will automatically cope with transmission beam non-correspondence, since phase changes and, in some implementations, also amplitude changes introduced by the components in transmission paths, environmental conditions, or user interaction will be compensated for directly at the antenna array, antenna element per antenna element. The advantages of this concept will be greater the larger the array is, since the radiation beam width will be narrower and transmission beam re-alignment more important. For example, 8×8 antenna array, a phase shift by 12° causes the actual transmission power to drop 14.2 dB, and at 15° azimuth-shift the transmission power received at the access point may be 29 dB lower than expected, likely causing a radio link failure. The same scenario for a 16×16 antenna and 7° misalignment causes 32 dB power drop, likely causing a radio link failure. With the disclosed concept it is possible to automatically avoid those power drops.

A further advantage of the self-adjusting (the apparatus adjusting automatically) is that there is no need for network assisted uplink re-alignment procedures.

The above adjustment procedure may be triggered every time, or every $x^{th}$ time, the apparatus transmits user data or control data (uplink user data or control data), or periodically, or randomly.

If uplink beam and downlink beam correspondence (transmission beam and reception beam correspondence) is assumed, then the settings, and adjusted settings of phase shifters for the transmission beam can be used for the reception beam (downlink beam) also.

Even though in all examples it is assumed that determining delta values etc are performed in a digital domain, it should be appreciated that the above examples can be implemented also in the analog domain as well. However, it should be appreciated that in the analog domain, if couplers are used, usually only one coupled transmission signal, i.e. one first signal, can be analysed at a time, resulting to the functionalities described with any of FIGS. 3 to 6 being performed sequentially.

Figure 7:
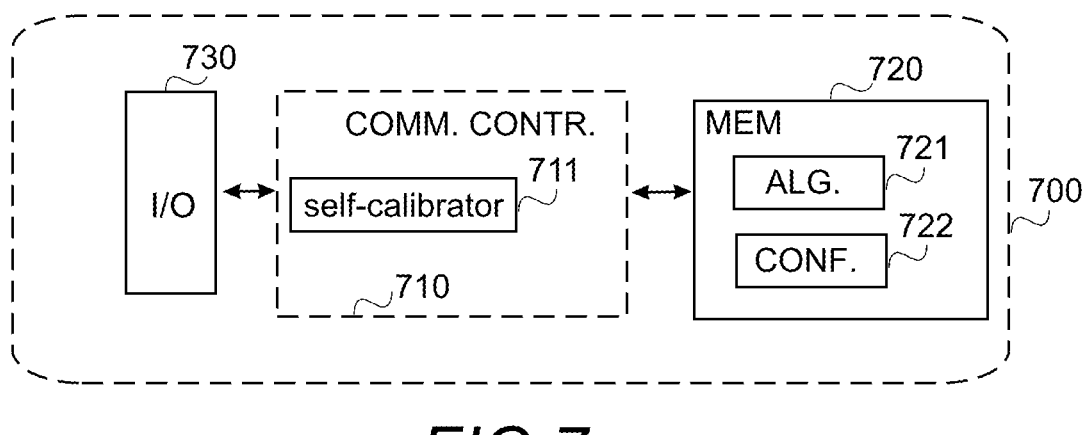
FIG. 7 is a schematic block diagram.

FIG. 7 illustrates an apparatus comprising a communication controller 710 such as at least one processor or processing circuitry, and at least one memory 720 including a computer program code (software, algorithm) ALG. 721, wherein the at least one memory and the computer program code (software, algorithm) are configured, with the at least one processor, to cause the respective apparatus to carry out any one of the embodiments, examples and implementations described above. The apparatus of FIG. 7 may be an electronic device, for example a user device or a base station (access node).

Referring to FIG. 7, the memory 720 may be implemented using any suitable data storage technology, such as semiconductor based memory devices, flash memory, magnetic memory devices and systems, optical memory devices and systems, fixed memory and removable memory. The memory may comprise a configuration storage CONF. 722, such as a configuration database, for at least storing one or more configurations and/or corresponding parameters/parameter values, for example the reference information. The memory 720 may further store a data buffer for data waiting for transmission and/or data waiting to be decoded.

Referring to FIG. 7, the apparatus 700 may further comprise a communication interface 730 comprising hardware and/or software for realizing communication connectivity according to one or more radio communication protocols.

The communication interface 730 may provide the apparatus with radio communication capabilities with one or more base stations (access nodes) of a wireless network and/or with one or more user devices in the wireless network. The communication interface may comprise standard well-known analog radio components such as an amplifier, filter, frequency-converter and circuitries, conversion circuitries transforming signals between analog and digital domains, and one or more antennas, as disclosed with FIG. 2. Digital signal processing regarding transmission and/or reception of signals may be performed in a communication controller 710.

The apparatus 700 may further comprise an application processor (not illustrated in FIG. 7) executing one or more computer program applications that generate a need to transmit and/or receive data The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application.

The communication controller 710 may comprise one or more self-calibrators 711 configured to perform beam alignment adjusting according to any one of the embodiments/examples/implementations described above.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile device or a similar integrated circuit in a sensor, a cellular network device, or another network device.

In an embodiment, at least some of the processes described in connection with FIGS. 2 to 6 may be carried out by an apparatus comprising corresponding means for carrying out at least some of the described processes. For example, the apparatus may be an apparatus comprising means for: measuring, while transmitting a combined uplink signal via the plurality of the array elements as individual signals forming the combined uplink signal, per an array element, a first signal on an unused branch of the array element, the first signal being a coupled individual signal of the transmitted combined uplink signal; performing, per an array element, at least following: determining a delta value based on a phase value of the first signal and the reference information; and adjusting, in response to the delta value not being within a tolerance, phase at least in the branch used for transmitting correspondingly. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments/examples/implementations of FIGS. 2 to 6, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FP-GAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems (apparatuses) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 6 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program. For example, the non-transitory medium may be a non-transitory computer readable medium comprising program instructions for causing an apparatus to perform at least the following: measuring, while transmitting a combined uplink signal via a plurality of array elements having cross-polarized coupled branches as individual signals forming the combined uplink signal, per an array element, a first signal on an unused branch of the array element, the first signal being a coupled individual signal of the transmitted combined uplink signal; determining, per an array element, a delta value based on a phase value of the first signal and the reference information; and adjusting, in response to the delta value not being within a tolerance, phase at least in the branch of the array element used for transmitting correspondingly.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
at least one antenna array comprising a plurality of array elements having cross-polarized coupled branches;
at least one processor; and
at least one memory storing instructions that, when executed by the at least one processor, cause the apparatus at least to perform:
measuring, while transmitting a combined uplink signal via the plurality of the array elements as individual signals forming the combined uplink signal, per an array element, a first signal on an unused branch of the array element, the first signal being a coupled individual signal of the transmitted combined uplink signal;

performing, per an array element, at least following:
determining a delta value based on a phase value of the first signal and reference information comprising a plurality of reference values, wherein determining the delta value comprises at least retrieving, from the reference information, a reference value of the plurality of reference values for the antenna element based on the order of the antenna element in the antenna array; and
adjusting, in response to the delta value not being within a tolerance, phase at least in the branch used for transmitting correspondingly.

2. The apparatus of claim 1, wherein (i) the memory further comprises a factor value for relative phase difference between adjacent antenna elements, (ii) the reference information comprises boresight cross-polarized coupled values, and (iii) determining the delta value further comprises:
extrapolating the reference value using the factor value to an estimated reference value for a beam steering direction in use; and
using the estimated reference value to determine the delta value.

3. The apparatus of claim 1, wherein (i) the reference information comprises reference values for different beam steering directions, (ii) retrieving from the reference information the reference value for the antenna element is further based on a beam steering direction in use, and (iii) determining the delta value further comprises:
using the reference value to determine the delta value.

4. The apparatus of claim 3, wherein the at least one memory stores instructions that, when executed by the at least one processor, cause the apparatus further to perform, per an array element:
retrieving from the reference information a further reference value for the antenna element based on the order of the antenna element in the antenna array and the beam steering direction in use;
determining a further delta value between an amplitude value of the first signal and the further reference value; and
adjusting, in response to the further delta not being within a further tolerance, power at least in the branch used for transmitting correspondingly.

5. The apparatus of claim 1, wherein one antenna element of the antenna array is a reference antenna element and the at least one memory stores instructions that, when executed by the at least one processor, cause the apparatus to use with the reference antenna element absolute values of the first signal of the reference antenna element and with other antenna elements first signals that are relative to the first signal of the reference antenna element.

6. The apparatus of claim 5, wherein the at least one memory stores instructions that, when executed by the at least one processor, cause the apparatus to use with the other antenna elements first signals that are further normalized to the first signal of the reference antenna element.

7. The apparatus of claim 1, wherein the at least one memory stores instructions that, when executed by the at least one processor, cause the apparatus to further perform measuring first signals in response to the apparatus sending as the combined uplink signal an uplink signal comprising user data.

8. The apparatus of claim 1, wherein the at least one memory stores instructions that, when executed by the at least one processor, cause the apparatus to further perform measuring first signals in response to the apparatus sending as the combined uplink signal an uplink signal comprising control data.

9. The apparatus of claim 1, wherein the reference information comprises values obtained during over the air calibration of another apparatus.

10. The apparatus of claim 1, wherein the apparatus comprises at least per a reception branch a coupler coupled to an antenna element of the antenna array.

11. The apparatus of claim 1, wherein the apparatus comprises at least per a reception branch an adjustable attenuator coupled to an antenna element of the antenna array.

12. A method comprising:

measuring, by an apparatus, while transmitting a combined uplink signal via a plurality of array elements having cross-polarized coupled branches as individual signals forming the combined uplink signal, per an array element, a first signal on an unused branch of the array element, the first signal being a coupled individual signal of the transmitted combined uplink signal;

determining, by the apparatus, per an array element, a delta value based on a phase value of the first signal and the reference information comprising a plurality of reference values, wherein determining the delta value comprises at least retrieving, from the reference information, a reference value of the plurality of reference values for the antenna element based on the order of the antenna element in the antenna array; and adjusting, by the apparatus, in response to the delta value not being within a tolerance, phase at least in the branch of the array element used for transmitting correspondingly.

13. The method of claim 12, wherein (i) the method further comprises a factor value for relative phase difference between adjacent antenna elements, (ii) the reference information comprises boresight cross-polarized coupled values, and (iii) determining the delta value further comprises:

extrapolating the reference value using the factor value to an estimated reference value for a beam steering direction in use; and using the estimated reference value to determine the delta value.

14. The method of claim 12, wherein (i) the reference information comprises reference values for different beam steering directions, (ii) retrieving from the reference information the reference value for the antenna element is further based on a beam steering direction in use, and (iii) determining the delta value further comprises:

using the reference value to determine the delta value.

15. The method as claimed in claim 14, wherein the method further comprises:

retrieving from reference information, which comprises reference values for different beam steering directions, reference values for phase and for amplitude for the antenna element based on the order of the antenna element in the antenna array and a beam steering direction in use;

using the reference value for phase to determine the delta value;

determining a further delta value between an amplitude value of the first signal and the reference value for amplitude; and adjusting, in response to the further delta not being within a further tolerance, power at least in the branch used for transmitting correspondingly.

16. The method of claim 12, wherein one antenna element of an antenna array is a reference antenna element and the method further comprises using with the reference antenna element absolute values of the first signal of the reference antenna element and with other antenna elements first signals that are relative to the first signal of the reference antenna element.

17. The method of claim 16, wherein the method further comprises using with the other antenna elements first signals that are further normalized to the first signal of the reference antenna element.

18. The method of claim 12, wherein the method further comprises performing measuring first signals in response to the apparatus sending as the combined uplink signal an uplink signal comprising user data.

19. The method of claim 12, wherein the method further comprises performing measuring first signals in response to the apparatus sending as the combined uplink signal an uplink signal comprising control data.

20. A non-transitory computer readable medium comprising program instructions that, when executed by an apparatus, cause the apparatus to perform at least the following:

measuring, while transmitting a combined uplink signal via a plurality of array elements having cross-polarized coupled branches as individual signals forming the combined uplink signal, per an array element, a first signal on an unused branch of the array element, the first signal being a coupled individual signal of the transmitted combined uplink signal;

determining, per an array element, a delta value based on a phase value of the first signal and the reference information comprising a plurality of reference values, wherein determining the delta value comprises at least retrieving, from the reference information, a reference value of the plurality of reference values for the antenna element based on the order of the antenna element in the antenna array; and adjusting, in response to the delta value not being within a tolerance, phase at least in the branch of the array element used for transmitting correspondingly.

\* \* \* \* \*